US009123104B2

(12) United States Patent
Kusuda et al.

(10) Patent No.: US 9,123,104 B2
(45) Date of Patent: Sep. 1, 2015

(54) APPARATUS AND METHODS FOR REDUCING COMMON-MODE NOISE IN AN IMAGING SYSTEM

(71) Applicant: Analog Devices, Inc., Norwood, MA (US)

(72) Inventors: Yoshinori Kusuda, San Jose, CA (US); Gary Robert Carreau, Plaistow, NH (US); Michael C. Coln, Lexington, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 14/204,832

(22) Filed: Mar. 11, 2014

(65) Prior Publication Data

US 2014/0193090 A1 Jul. 10, 2014

Related U.S. Application Data

(63) Continuation of application No. 13/181,990, filed on Jul. 13, 2011, now abandoned.

(51) Int. Cl.
*H01L 27/00* (2006.01)
*G06T 5/00* (2006.01)
*H04L 25/02* (2006.01)

(52) U.S. Cl.
CPC .............. *G06T 5/002* (2013.01); *H04L 25/028* (2013.01)

(58) Field of Classification Search
CPC ...................................................... H04N 5/3655
USPC ....................................... 250/208.1; 348/241
See application file for complete search history.

(56) References Cited

U.S. PATENT DOCUMENTS

| 6,522,355 B1 * | 2/2003 | Hynecek et al. ............... 348/245 |
| 7,417,463 B1 | 8/2008 | Danesh et al. |
| 7,427,735 B2 * | 9/2008 | Eskerud ..................... 250/208.1 |
| 8,405,607 B2 | 3/2013 | Raynor |

(Continued)

FOREIGN PATENT DOCUMENTS

| KR | 10-2010-0045715 | 5/2010 |
| KR | 10-1032993 | 5/2011 |

OTHER PUBLICATIONS

Weiss, *A 1 GS/S 8-Bit GaAs DAC with On-Chip Current Sources*, Institute of Electrical and Electronics Engineers, Proceedings of the Gallium Arsenide Integrated Circuit Symposium (GaAs IC) Grenelefe, Florida, Oct. 28-30, 1986, vol. SYMP 8, pp. 217-220.
International Search Report and Written Opinion of the International Searching Authority in PCT Appl. No. PCT/US2012/045535, dated Oct. 16, 2012.
Korean Office Action of Nov. 10, 2014 and English translation thereof for Korean Patent Application No. 10-2013-7032620, filed on Dec. 9, 2013. 11 pages.

(Continued)

*Primary Examiner* — Thanh Luu
(74) *Attorney, Agent, or Firm* — Knobbe Martens Olson & Bear LLP

(57) ABSTRACT

Apparatus and methods reduce common-mode error. An integrated circuit includes a plurality of signal channels, a first proxy channel, and a subtraction block. The signal channels are configured to receive a plurality of input signals and to generate a plurality of output signals, and each of the signal channels has a substantially similar circuit topology. The first proxy channel has a substantially similar circuit topology as the plurality of signal channels, and includes an output that can vary in relation to a common-mode error of the signal channels. The subtraction block is configured to generate a plurality of modified output signals by using the output of the first proxy channel to reduce the common-mode error of the plurality of output signal channels.

22 Claims, 10 Drawing Sheets

(56) References Cited

U.S. PATENT DOCUMENTS

| | | | |
|---|---|---|---|
| 2010/0053379 A1* | 3/2010 | Willassen | 348/241 |
| 2010/0097501 A1 | 4/2010 | Fowler | |
| 2011/0260710 A1 | 10/2011 | Zhu et al. | |
| 2012/0162484 A1 | 6/2012 | Mo et al. | |

OTHER PUBLICATIONS

Korean Office Action dated May 27, 2015 and English Translation thereof for Korean Patent Application No. Oct. 2013-7032620, filed on Dec. 9, 2013 in 5 pp.. X.

* cited by examiner

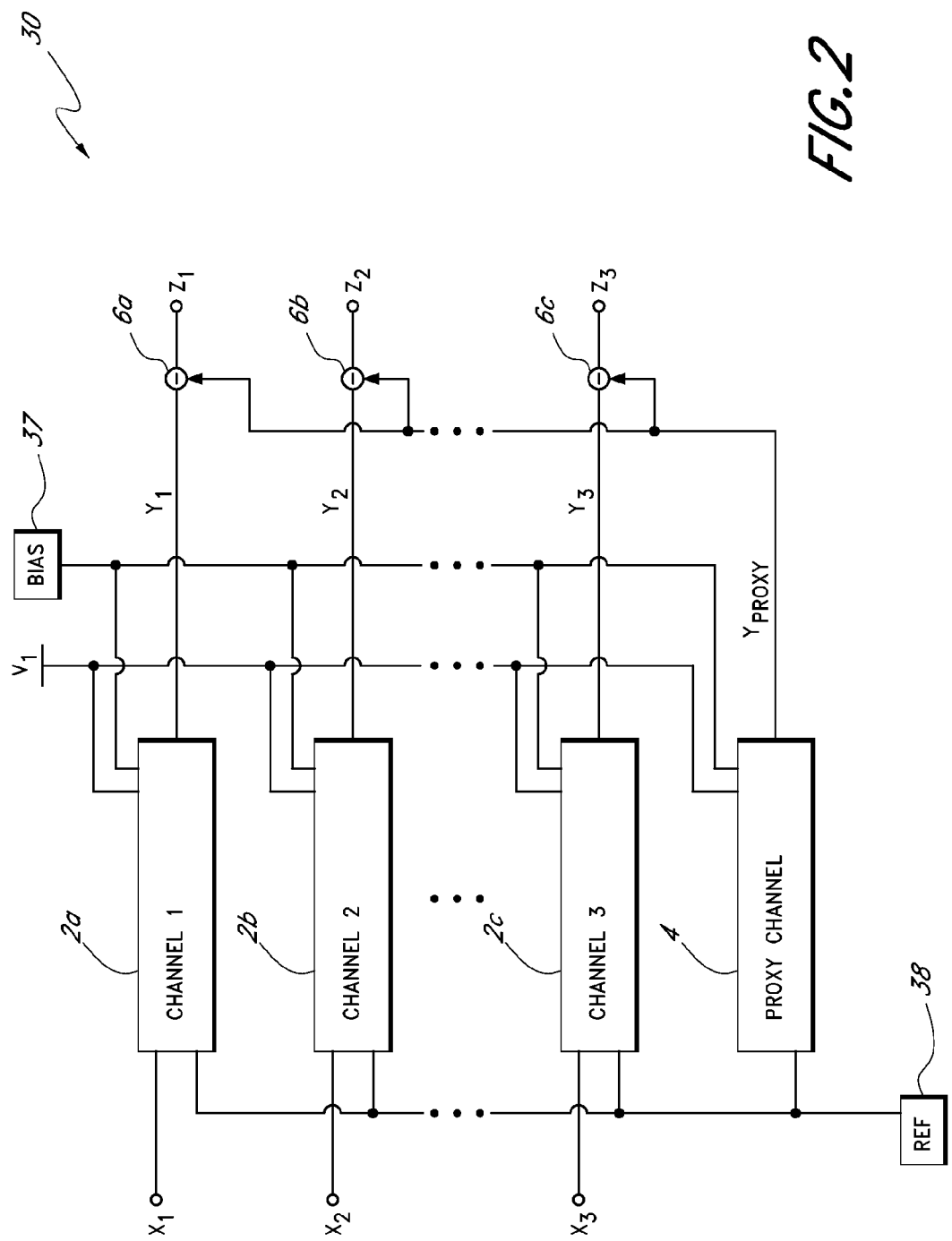

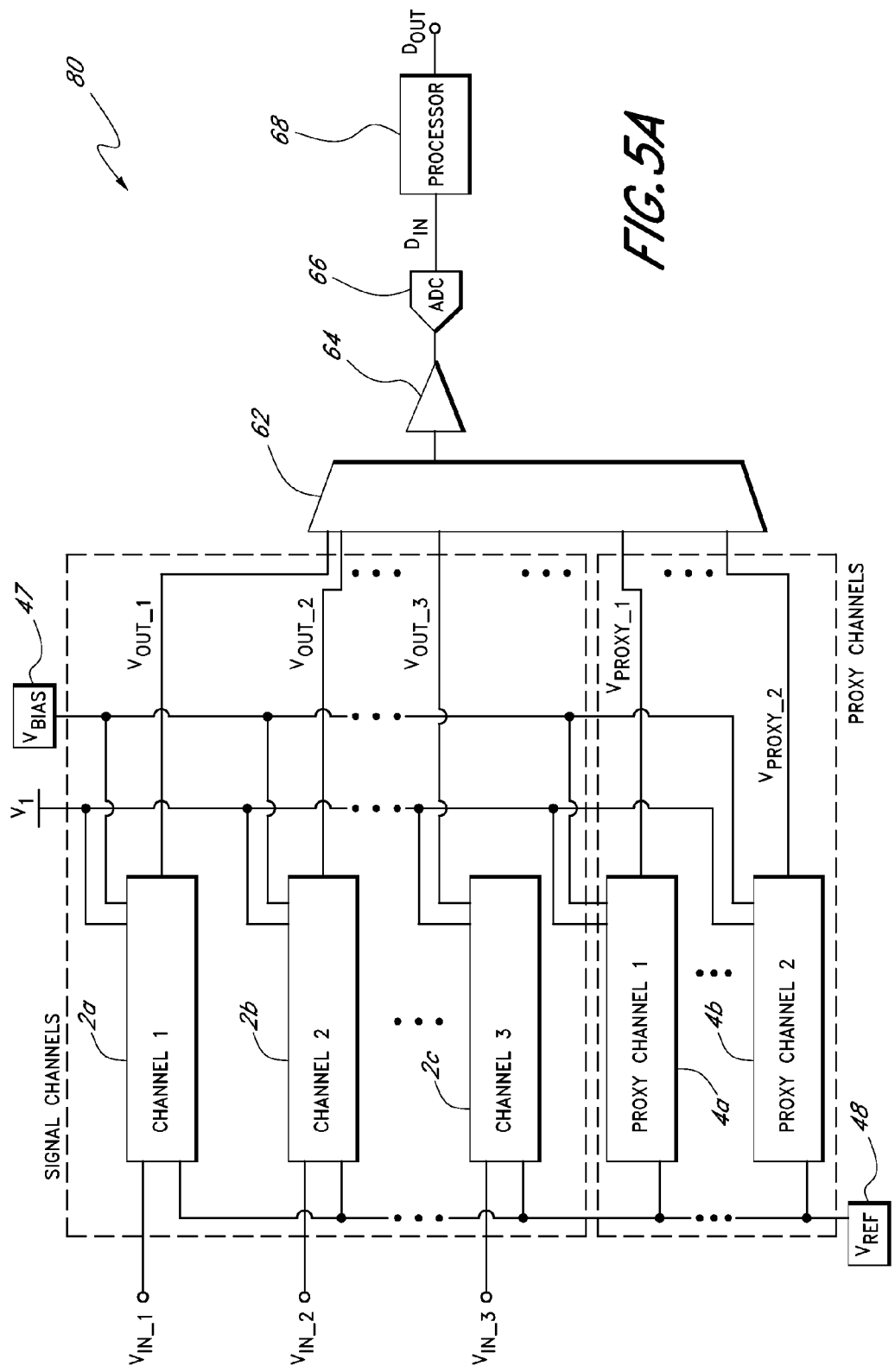

APPARATUS AND METHODS FOR REDUCING COMMON-MODE NOISE IN AN IMAGING SYSTEM

CROSS REFERENCE TO RELATED APPLICATIONS

This application is a continuation of U.S. application Ser. No. 13/181,990, filed Jul. 13, 2011, entitled "APPARATUS AND METHOD FOR REDUCING COMMON-MODE ERROR", the entire disclosure of which is hereby incorporated herein by reference.

BACKGROUND

1. Field

Embodiments of the invention relate to electronic devices, and more particularly, to electronic systems including signal channels.

2. Description of the Related Technology

Certain electronic systems can include signal channels for processing signals. For example, an imaging system can include an integrated circuit (IC) having signal channels for processing signals received from image sensors. The signal channels can have a common-mode error that can arise from a variety of sources, such as common-mode noise and/or systematic offsets associated with the signal channels.

Common-mode error can degrade the integrity of data processed using the signal channels. For example, in an imaging system implementation, common-mode error of the signal channels can lead to line-to-line pattern errors that can cause visible artifacts in images generated using the imaging system. In certain applications, reducing common-mode error by using differential signaling and/or by increasing circuit area or power consumption may not be a reasonable solution.

There is a need for improved signal processing in electronic systems including signal channels. Furthermore, there is a need for reducing common-mode error in ICs used for signal processing.

SUMMARY

In one embodiment, an apparatus includes an integrated circuit. The integrated circuit includes a plurality of signal channels configured to receive a plurality of input signals and to process the plurality of input signals to generate a plurality of output signals. Each of the plurality of signal channels has a substantially similar circuit topology to one another. The integrated circuit further includes a first proxy channel having a substantially similar circuit topology as the plurality of signal channels. The first proxy channel is configured to generate a proxy output signal that is associated with a common-mode noise of the plurality of signal channels. The integrated circuit further includes a subtraction block configured to subtract the proxy output signal from the plurality of output signals to generate a plurality of modified output signals such that a common-mode error of the plurality of modified output signals is reduced.

In another embodiment, a method of reducing common-mode error is provided. The method includes processing a plurality of input signals using a plurality of signal channels to generate a plurality of output signals. Each of the plurality of signal channels comprises substantially similar electrical circuitry to each other. The method further includes generating a proxy output signal using a first proxy channel that comprises substantially similar electrical circuitry as the plurality of signal channels. The proxy output signal is associated with a common-mode noise of the plurality of signal channels. The method further includes generating a plurality of modified output signals by using the proxy output signal from the first proxy channel to modify the plurality of output signals such that a common-mode error is reduced.

In another embodiment, an apparatus includes an integrated circuit. The integrated circuit includes a plurality of signal channels configured to receive a plurality of input signals and to process the plurality of input signals to generate a plurality of output signals. Each of the plurality of signal channels has a substantially similar circuit topology to one another. The integrated circuit further includes a proxy channel having a substantially similar circuit topology as the plurality of signal channels. The proxy channel is configured to generate a proxy output signal that is associated with a common-mode noise of the plurality of signal channels. The integrated circuit further includes a means for subtracting the proxy output signal from the plurality of output signals to generate a plurality of modified output signals such that a common-mode error of the plurality of modified output signals is reduced.

In another embodiment, an apparatus includes an integrated circuit. The integrated circuit includes a signal channel configured to receive an input signal and to process the input signal to generate an output signal. The integrated circuit further includes a proxy channel having a substantially similar circuit topology as the signal channel. The proxy channel is configured to generate a proxy output signal that is associated with a common-mode noise of the signal channel. The integrated circuit further includes a subtraction block configured to subtract the proxy output signal from the output signal to generate a modified output signal such that a common-mode error of the modified output signal is reduced.

BRIEF DESCRIPTION OF THE DRAWINGS

FIG. 2 is a schematic block diagram of an integrated circuit (IC) according to one embodiment.

FIG. 5A is a schematic block diagram of an IC according to another embodiment.

DETAILED DESCRIPTION OF EMBODIMENTS

Figure 1A:
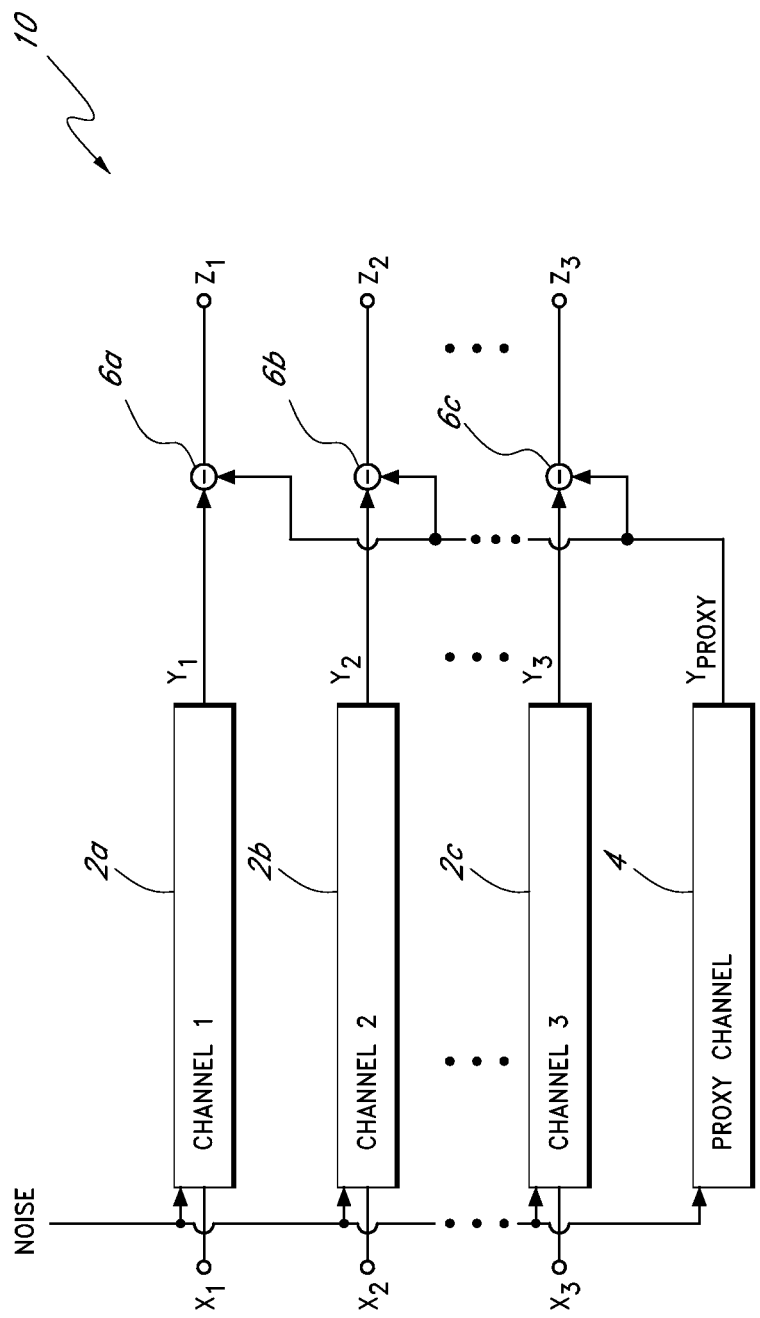
FIG. 1A is a schematic block diagram of an electronic system according to one embodiment.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Overview of Electronic Systems Including One or More Proxy Channels

In certain implementations described herein, an electronic system includes a plurality of signal channels and a proxy channel. Each of the signal channels can have a similar circuit topology, and can be used to process signals received by the electronic system. For example, the electronic system can be an imaging system that includes a plurality of image processing circuit channels for processing data from image sensors. To aid in reducing common-mode error of the signal channels, such as common-mode error arising from common-mode noise and/or systematic offset of the channels, a proxy channel can be included in the electronic system. The proxy channel can be substantially similar to each of the signal channels, but need not receive an input signal. Rather, the proxy channel can have an output that varies in relation to the common-mode error of the signal channels. The output of the proxy channel can be subtracted from the output of each of the signal channels, thereby reducing common-mode error. In certain embodiments, the electronic system includes a plurality of proxy channels, and the outputs of the proxy channels are averaged or otherwise processed to aid in reducing proxy channel random noise.

FIG. 1A is a schematic block diagram of an electronic system 10 according to one embodiment. The electronic system 10 includes a plurality of signal channels $2a$-$2c$, a proxy channel 4, and a plurality of subtractors $6a$-$6c$.

The electronic system 10 can receive a plurality of electrical input signals $X_1$-$X_3$ and can process the input signals using the plurality of signal channels $2a$-$2c$ to generate a plurality of output signals $Y_1$-$Y_3$. For example, the illustrated electronic system 10 includes a first channel $2a$ for receiving a first input signal $X_1$ and for generating a first output signal $Y_1$. Additionally, the electronic system includes a second signal channel $2b$ for receiving a second input signal $X_2$ and for generating a second output signal $Y_2$. Furthermore, the electronic system 10 includes a third signal channel $3b$ for receiving a third input signal $X_3$ and for generating a third output signal $Y_3$. Although three signal channels $2a$-$2c$ are illustrated in FIG. 1A, more or fewer signal channels can be included to aid in processing a desired number of electrical signals. For example, the electronic system 10 can include one signal channel, two signal channels, three signal channels, or four or more signal channels.

The electronic system 10 can be any suitable electronic system, including, for example, an imaging system. The signal channels $2a$-$2c$ can be configured to process the electrical input signals $X_1$-$X_3$, respectively, in substantially the same way. For example, the signal channels $2a$-$2c$ can include circuitry that has substantially the same topology and layout.

The signal channels $2a$-$2c$ can be single-ended channels that have a common-mode error. For instance, the signal channels $2a$-$2c$ can be disposed on an integrated circuit, and common-mode power supply noise, reference supply noise, and/or bias circuit noise can be injected into the signal channels $2a$-$2c$. The common-mode noise can degrade the signal quality of signals generated using the electronic system 10. For example, in an imaging system, common-mode errors can cause line-to-line pattern errors that may generate artifacts in a resulting image. The common-mode error of the signal channels $2a$-$2c$ can also be increased by systematic offsets, such as offsets associated with a layout design of the signal channels $2a$-$2c$.

The electrical input signals $X_1$-$X_3$ can be any suitable electrical signals, including, for example, voltage signals and/or current signals. In certain implementations, the electrical input signals $X_1$-$X_3$ are current signals generated from an array of photodetectors. The signal channels $2a$-$2c$ can be used to process the electrical input signals $X_1$-$X_3$ to generate the output signals $Y_1$-$Y_3$, respectively. For example, in certain implementations, the signal channels $2a$-$2c$ can be used to integrate the input signals $X_1$-$X_3$, respectively, to generate the output signals $Y_1$-$Y_3$. In some implementations, the signal channels $2a$-$2c$ can be configured to amplify the input signals $X_1$-$X_3$ to a level suitable for further processing. The output signals $Y_1$-$Y_3$ can be voltage signals, current signals and/or any other suitable electrical signals. In certain implementations, the input signals $X_1$-$X_3$ can be a different type of electrical signal than the output signals $Y_1$-$Y_3$. For instance, the input signals $X_1$-$X_3$ can each be current signals, and the output signals $Y_1$-$Y_3$ can each be voltage signals, or vice versa.

The output signals $Y_1$-$Y_3$ can include a signal component and an error component. For example, common-mode noise sources and/or systematic offset can introduce error in the output signals $Y_1$-$Y_3$. To aid in reducing the common-mode error of the output signals $Y_1$-$Y_3$, the proxy channel 4 can be included. The proxy channel 4 can be substantially similar to each of the signal channels $2a$-$2c$, and can be subjected to similar common-mode noise and can have a similar systematic offset. In one embodiment, the proxy channel 4 is identical to the signal channels $2a$-$2c$. However, in contrast to the signal channels $2a$-$2c$, the proxy channel 4 need not receive an input signal. Rather, the proxy channel 4 can have a proxy channel output $Y_{PROXY}$ that varies in relation to the common-mode error of the signal channels $2a$-$2c$. In one embodiment, the proxy channel 4 includes an input that is biased to a DC voltage level that is about the same as that of the signal channels $2a$-$2c$, but the proxy channel 4 is not configured to receive an input signal.

The electronic system 10 includes the subtractors $6a$-$6c$, which can operate as a subtraction block for subtracting the proxy channel output $Y_{PROXY}$ from each of the output signals $Y_1$-$Y_3$. For example, the first subtractor $6a$ includes a first input for receiving the first output signal $Y_1$, a second input for receiving the proxy output signal $Y_{PROXY}$, and an output for generating a first common-mode noise-reduced output signal $Z_1$ that is equal to about the difference between the first output signal $Y_1$ and the proxy output signal $Y_{PROXY}$. Similarly, the second subtractor $6b$ includes a first input for receiving the second output signal $Y_2$, a second input for receiving the proxy output signal $Y_{PROXY}$, and an output for generating a second common-mode noise-reduced output signal $Z_2$ that is equal to about the difference between the second output signal $Y_2$ and the proxy output signal $Y_{PROXY}$. Likewise, the third subtractor $6c$ includes a first input for receiving the third output signal $Y_3$, a second input for receiving the proxy output signal $Y_{PROXY}$, and an output for generating a third common-mode noise-reduced output signal $Z_3$ that is equal to about the difference between the third output signal $Y_3$ and the proxy output signal $Y_{PROXY}$. The subtractors $6a$-$6c$ can be implemented in any suitable way, including, for example, using analog and/or digital circuitry. The common-mode noise-reduced output signals $Z_1$-$Z_3$ can be in an analog or a digital format.

Figure 1B:
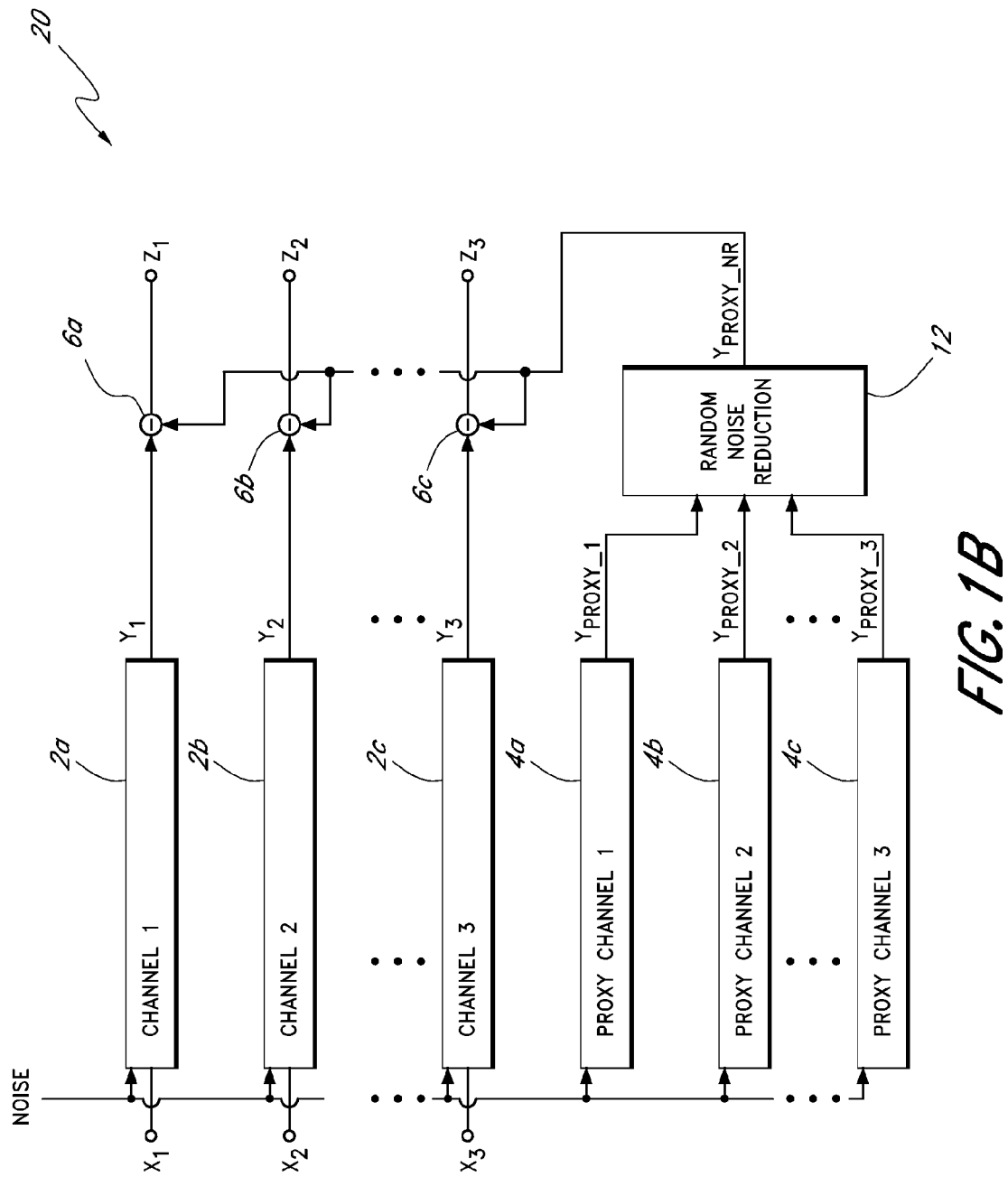
FIG. 1B is a schematic block diagram of an electronic system according to another embodiment.

FIG. 1B is a schematic block diagram of an electronic system 20 according to another embodiment. The electronic system 20 includes the first, second and third signal channels $2a$-$2c$, the first, second and third subtractors $6a$-$6c$, a plurality of proxy channels $4a$-$4c$, and a random noise reduction block 12.

The electronic system 20 of FIG. 1B is similar to the electronic system 10 of FIG. 1A. However, in contrast to the electronic system 10 of FIG. 1A that includes the proxy channel 4, the electronic system 20 of FIG. 1B includes the proxy channels 4a-4c and the random noise reduction block 12. For example, the electronic system 20 includes a first proxy channel 4a configured to generate a first proxy output signal $Y_{PROXY\_1}$, a second proxy channel 4b configured to generate a second proxy output signal $Y_{PROXY\_2}$, and a third proxy channel 4c configured to generate a third proxy output signal $Y_{PROXY\_3}$, each of which can be provided to the random noise reduction block 12 as an input. The random noise reduction block 12 can be configured to process the first, second and third proxy output signals $Y_{PROXY\_1}$-$Y_{PROXY\_3}$ to generate a random noise-reduced proxy output signal $Y_{PROXY\_NR}$.

Although three proxy channels 4a-4c are illustrated in FIG. 1B, more or fewer proxy channels can be included. For example, in other implementations, the electronic system 20 can include one proxy channel, two proxy channels or four or more proxy channels. Additionally, although three signal channels 2a-2c are illustrated in FIG. 1B, more or fewer signal channels can be included. Furthermore, the number of signal channels need not match the number of proxy channels. For instance, four signal channels and two proxy channels can be provided, eight signal channels and three proxy channels can be provided, and/or any suitable combination of signal channels and proxy channels can be used.

Including the proxy channels 4a-4c and the random noise reduction block 12 can aid in reducing random noise in the electronic system 20 relative to a design using a single proxy channel. For example, although the proxy channel 4 of the electronic system 10 of FIG. 1A can be used to subtract common-mode noise and systematic offset from the outputs of the signal channels 2a-2c, the proxy channel 4 can introduce a random noise component into each of the common-mode noise-reduced output signals $Z_1$-$Z_3$. For example, if each of the signal channels 2a-2c and the proxy channel 4 of FIG. 1A include random noise that is uncorrelated and has a Gaussian distribution, use of the proxy channel 4 to reduce common-mode noise and systematic offset of the signal channels can increase the root mean square (RMS) random noise at the output of each of the signal channels 2a-2c by a factor equal to about $\sqrt{2}$.

To aid in reducing random noise associated with including the proxy channel, a plurality of proxy channels 4a-4c can be provided, and the outputs of the proxy channels can be processed by the random noise reduction block 12 to generate a random noise-reduced proxy output signal $Y_{PROXY\_NR}$ that can have a RMS random noise that is less than a RMS random noise of a single proxy channel. In certain implementations, the random noise reduction block 12 can be configured to average the outputs of the plurality of proxy channels 4a-4c to generate a random noise-reduced proxy output signal $Y_{PROXY\_NR}$. In configurations in which the random noise reduction block 12 averages the output of n proxy channels exposed to uncorrelated Gaussian noise, the random noise-reduced proxy output signal $Y_{PROXY\_NR}$ can have a RMS random noise that is reduced by a factor of $\sqrt{n}$ relative to a RMS random noise of a single proxy channel. Accordingly, by increasing the number of proxy channels, a desired level of reduction of proxy channel random noise can be achieved.

FIG. 2 is a schematic block diagram of an IC 30 according to one embodiment. The IC 30 includes the signal channels 2a-2c, the proxy channel 4, the subtractors 6a-6c, a bias circuit 37, and a reference circuit 38. The signal channels 2a-2c receive input signals $X_1$-$X_3$ and generate output signals $Y_1$-$Y_3$, respectively. The signal channels 2a-2c and the proxy channel 4 each are electrically connected to the supply voltage $V_1$, each receive a reference signal from the reference circuit 38, and each receive a bias signal from the bias circuit 37. The subtractors 6a-6c are configured to subtract the proxy output signal $Y_{PROXY}$ from the output signals $Y_1$-$Y_3$ to generate common-mode noise-reduced output signals $Z_1$-$Z_3$, respectively. Although three signal channels 2a-2c are illustrated in FIG. 2, more or fewer signal channels can be included.

As illustrated in FIG. 2, in certain implementations the signal channels 2a-2c are disposed on an IC, such as the IC 30. The signal channels 2a-2c can be exposed to a variety of noise conditions, such as circuit noise conditions. For example, noise in the supply voltage $V_1$, in the bias circuit 37, and/or in the reference circuit 38 can be injected into the signal channels 2a-2c. Furthermore, the signal channels 2a-2c can be singled-ended channels that have a systematic offset, such as offset associated with a circuit layout and/or charge injection in implementations in which the signal channels include switched capacitor circuits.

To aid in reducing common-mode circuit noise and reducing offset at the outputs of the signal channels 2a-2c, the proxy channel 4 can be provided, and the output of the proxy channel 4 can be subtracted from the output signals $Y_1$-$Y_3$ to generate common-mode noise-reduced output signals $Z_1$-$Z_3$, respectively. Since the proxy channel 4 can have a similar circuit topology and layout and can be exposed to similar noise conditions as the signal channels 2a-2c, the proxy channel 4 can be used to substantially eliminate common-mode noise and systematic offset associated with the signal channels 2a-2c. Additional details of the signal channels 2a-2c and the proxy channel 4 can be similar to those described earlier with respect to FIGS. 1A-1B. Although one proxy channel 4 is illustrated in FIG. 2, the IC 30 can be modified to include a plurality of proxy channels to aid in reducing proxy channel random noise, as was described earlier.

Figure 3:
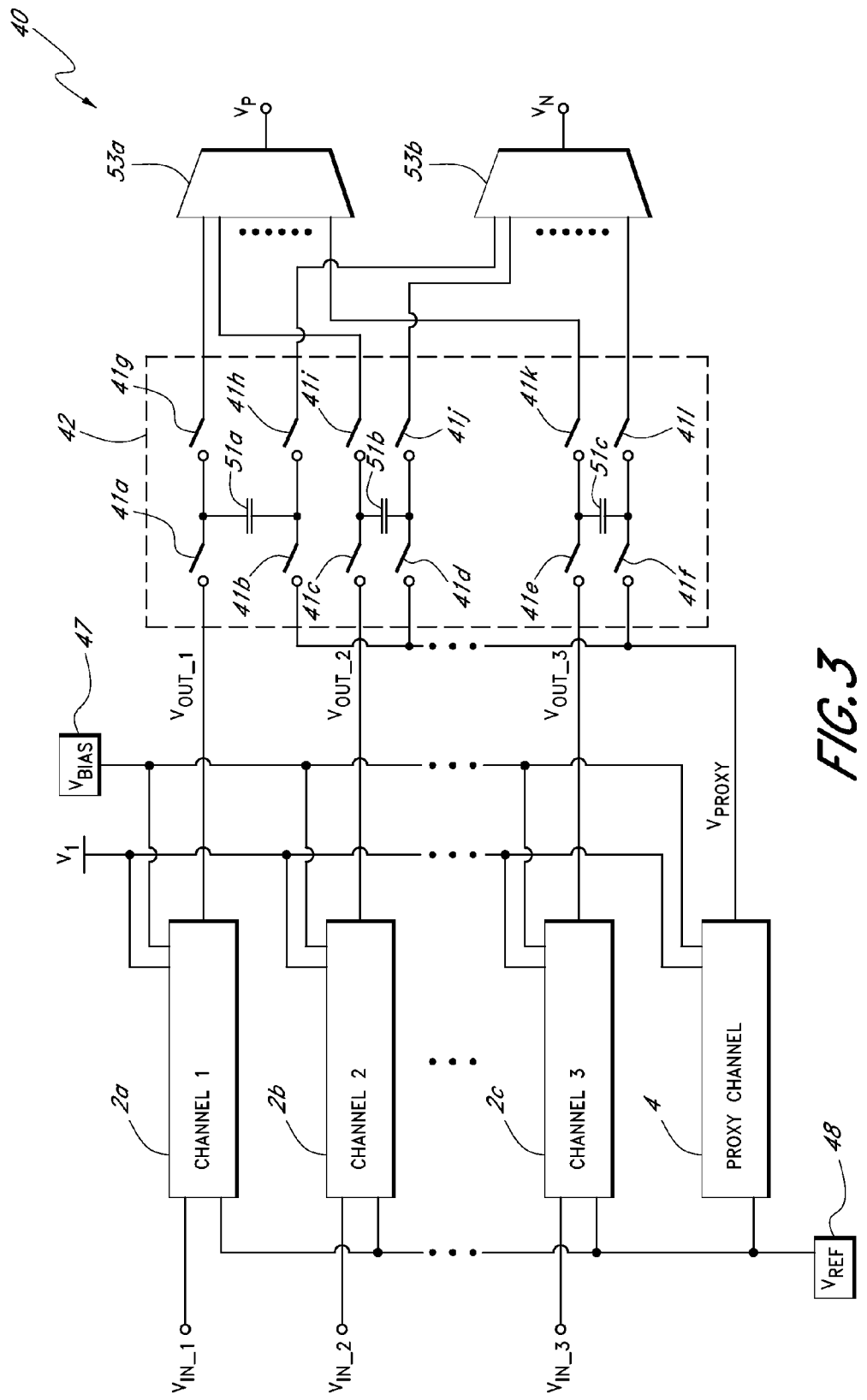
FIG. 3 is a schematic block diagram of an IC according to another embodiment.

FIG. 3 is a schematic block diagram of an IC 40 according to another embodiment. The IC 40 includes the first, second and third signal channels 2a-2c, the proxy channel 4, a bias voltage circuit 47, a voltage reference circuit 48, a subtraction block 42, and first and second multiplexers 53a, 53b.

The first signal channel 2a includes an input configured to receive a first input voltage $V_{IN\_1}$, and an output configured to generate a first output voltage $V_{OUT\_1}$. Additionally, the second signal channel 2b includes an input configured to receive a second input voltage $V_{IN\_2}$, and an output configured to generate a second output voltage $V_{OUT\_2}$. Furthermore, the third signal channel 2c includes an input configured to receive a third input voltage $V_{IN\_3}$, and an output configured to generate a third output voltage $V_{OUT\_3}$. Although the illustrated IC 40 includes three signal channels 2a-2c, in other embodiments, the IC 40 can include more or fewer signal channels.

The proxy channel 4 can have a circuit topology substantially the same as each of the signal channels 2a-2c, and can have an output configured to generate a proxy output voltage $V_{PROXY}$. In a manner similar to that describer earlier, the proxy output voltage $V_{PROXY}$ can have a voltage level corresponding to the common-mode error of the signal channels 2a-2c, and can be subtracted from the outputs of each of the signal channels 2a-2c using the subtraction block 42 so as to reduce the common-mode error of the signals generated using the IC 40.

The signal channels 2a-2c and the proxy channel 4 each include circuitry powered using a power supply voltage $V_1$ and biased using the bias voltage circuit 47. In certain implementations, the signal channels 2a-2c and the proxy channel 4 each include an amplifier that is powered using the power supply voltage $V_1$ and biased using a bias voltage generated using the bias voltage circuit 47. The signal channels 2a-2c and the proxy channel 4 also are each configured to receive a reference voltage generated using the voltage reference circuit 48. The signal channels 2a-2c can use the voltage reference circuit 48 to aid in processing (for example, amplifying) the input signals $V_{IN\_1}$-$V_{IN\_3}$, respectively. Although one configuration of bias and reference circuits is illustrated, other implementations are possible.

The illustrated subtraction block 42 is configured to receive the output voltages $V_{OUT\_1}$-$V_{OUT\_3}$ from the signal channels 2a-2c and the proxy output voltage $V_{PROXY}$ from the proxy channel 4. The subtraction block 42 is electrically coupled to the first and second multiplexers 53a, 53b, which include a first output $V_P$ and a second output $V_N$, respectively. As will be described below, the subtraction block 42 can subtract the proxy output voltage $V_{PROXY}$ from each of the output voltages $V_{OUT\_1}$-$V_{OUT\_3}$ to generate a plurality of common-mode noise-reduced output voltages. Additionally, a common-mode noise-reduced output voltage associated with a particular signal channel can be provided differentially between the first and second outputs $V_P$, $V_N$ using the first and second multiplexers 53a, 53b.

The illustrated subtraction block 42 includes first, second and third capacitors 51a-51c and first through twelfth switches 41a-41l. The first switch 41a includes a first end electrically connected to the first output voltage $V_{OUT\_1}$ and a second end electrically connected to a first end of the first capacitor 51a and to a first end of the seventh switch 41g. The second switch 41b includes a first end electrically connected to the proxy output voltage $V_{PROXY}$ and a second end electrically connected to a second end of the first capacitor 51a and to a first end of the eighth switch 41h. The third switch 41c includes a first end electrically connected to the second output voltage $V_{OUT\_2}$ and a second end electrically connected to a first end of the second capacitor 51b and to a first end of the ninth switch 41i. The fourth switch 41d includes a first end electrically connected to the proxy output voltage $V_{PROXY}$ and a second end electrically connected to a second end of the second capacitor 51b and to a first end of the tenth switch 41j. The fifth switch 41e includes a first end electrically connected to the third output voltage $V_{OUT\_3}$ and a second end electrically connected to a first end of the third capacitor 51c and to a first end of the eleventh switch 41k. The sixth switch 41f includes a first end electrically connected to the proxy output voltage $V_{PROXY}$ and a second end electrically connected to a second end of the third capacitor 51c and to a first end of the twelfth switch 41l. The seventh switch 41g, the ninth switch 41i, and the eleventh switch 41k each include a second end electrically connected to the first multiplexer 53a. The eighth switch 41h, the tenth switch 41j, and the twelfth switch 41l each include a second end electrically connected to the second multiplexer 53b.

The illustrated subtraction block 42 is a switched capacitor circuit that can be configured to subtract the proxy output voltage $V_{PROXY}$ from each of the output voltages $V_{OUT\_1}$-$V_{OUT\_3}$. For example, during a first phase of the subtraction block 42, the first through sixth switches 41a-41f can be closed and the seventh through twelfth switches 41g-41l can be opened. By configuring the switches in this manner, a voltage equal to about $V_{OUT\_1}$ minus $V_{PROXY}$ can be charged across the first capacitor 51a, a voltage equal to about $V_{OUT\_2}$ minus $V_{PROXY}$ can be charged across the second capacitor 51b, and a voltage equal to about $V_{OUT\_3}$ minus $V_{PROXY}$ can be charged across the third capacitor 51c. Accordingly, the illustrated subtraction block 42 can be used to subtract the output voltage $V_{PROXY}$ from each of the output voltages $V_{OUT\_1}$-$V_{OUT\_3}$, thereby generating first, second and third common-mode noise-reduced output voltages across the first, second and third capacitors 51a-51c, respectively.

The subtraction block 42 and the first and second multiplexers 53a, 53b can be used to select a particular common-mode noise-reduced output voltage associated with a particular signal channel. For example, during a second phase of the subtraction block 42, the first through sixth switches 41a-41f can be opened and the seventh through twelfth switches 41g-41l can be closed, and the voltage across the first, second or third capacitors 51a-51c can be selected using the multiplexers 53a, 53b. For instance, by selecting the path associated with the seventh switch 41g and the eighth switch 41h using the first and second multiplexers 53a, 53b, respectively, an output voltage between $V_P$ and $V_N$ that is equal to about $V_{OUT\_1}$ minus $V_{PROXY}$ can be generated. Similarly, the first and second multiplexers 53a, 53b can generate an output voltage between $V_P$ and $V_N$ that is voltage equal to about $V_{OUT\_2}$ minus $V_{PROXY}$ by selecting the path associated with the ninth switch 41i and the tenth switch 41j, respectively. Likewise, the first and second multiplexers 53a, 53b can generate an output voltage between $V_P$ and $V_N$ that is voltage equal to about $V_{OUT\_3}$ minus $V_{PROXY}$ by selecting the path associated with the eleventh switch 41k and the twelfth switch 41l, respectively.

Including the first and second multiplexers 53a, 53b can aid in processing signals. For example, the $V_P$ and $V_N$ signals can be electrically connected to a processing block configured to process signals associated with the signal channels 2a-2c, and the first and second multiplexers 53a, 53b can be used to generate a serial stream of data for the processing block. However, in certain implementations such as configurations including a separate processing block for each signal channel, the first and second multiplexers 53a, 53b can be omitted.

Although the illustrated IC 40 is shown as including three signal channels 2a-2c and one proxy channel 4, any suitable number of signal channels and proxy channels can be included. For example, more proxy channels can be included and more or fewer signal channels can be provided to aid in processing the desired number of signal channels.

Figure 4A:
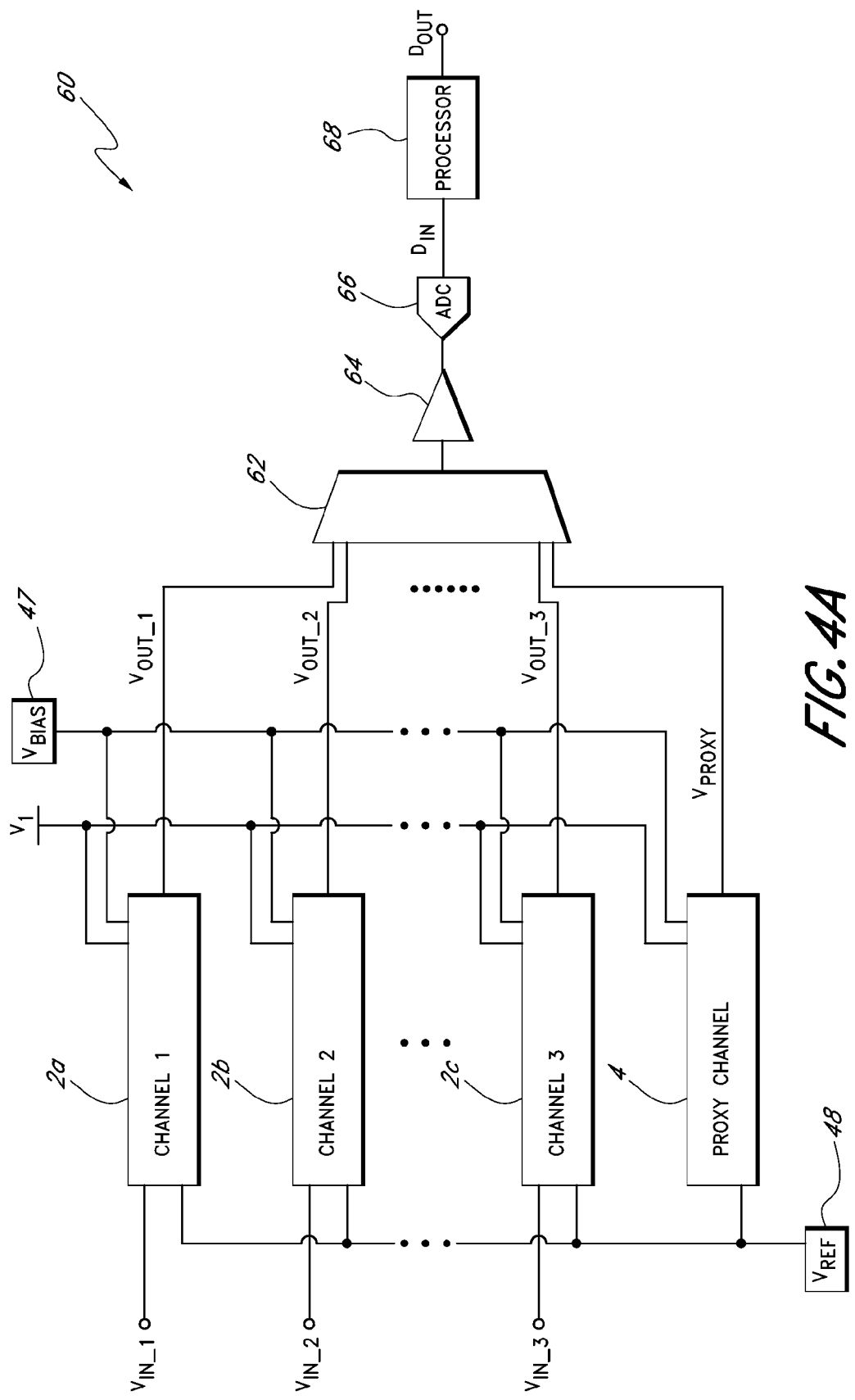
FIG. 4A is a schematic block diagram of an IC according to another embodiment.

FIG. 4A is a schematic block diagram of an IC 60 according to another embodiment. The IC 60 includes the first, second and third signal channels 2a-2c, the proxy channel 4, the bias voltage circuit 47, and the voltage reference circuit 48, which can be similar to that described earlier with respect to FIG. 3. The IC 60 further includes a multiplexer 62, an amplifier 64, an analog-to-digital (A-to-D) converter 66, and a processor 68.

The multiplexer 62 includes a plurality of inputs configured to receive the proxy output voltage $V_{PROXY}$ from the proxy channel 4 and the output voltages $V_{OUT\_1}$-$V_{OUT\_3}$ of the signal channels 2a-2c. The multiplexer 62 further includes an output electrically connected to an input of the amplifier 64. The amplifier 64 can be used to amplify the output of the multiplexer 62 and provide the amplified multiplexer output signal to an input of the A-to-D converter 66. The A-to-D converter 66 can be configured to convert the output of the amplifier 64 to a digital input signal $D_{IN}$. The A-to-D converter 66 can have any suitable resolution, such as a resolution ranging between about 12 bits to about 18 bits. Other amounts of resolution will be readily determined by persons having ordinary skill in the art. The processor 68 can process the digital input signal $D_{IN}$ to generate a digital output signal $D_{OUT}$. Although the processor 68 is illustrated as a single block, in certain implementations a plurality of processing modules can be used.

The processor 68 can be used to subtract the proxy output voltage $V_{PROXY}$ generated by the proxy channel 4 from the output voltages $V_{OUT\_1}$-$V_{OUT\_3}$ of the signal channels 2a-2c, respectively. For example, the multiplexer 62, the amplifier 64, and the A-to-D converter 66 can be used to generate the digital input signal $D_{IN}$, which can include a digital representation of the output voltage $V_{PROXY}$ and a digital representation of each of the output voltages $V_{OUT\_1}$-$V_{OUT\_3}$. The processor 68 can process the digital input signal $D_{IN}$ so as to subtract the digital value of the output voltage $V_{PROXY}$ from the digital value of each of the output voltages $V_{OUT\_1}$-$V_{OUT\_3}$. Additionally, the processor 68 can generate the digital output signal $D_{OUT}$, which can include a serial stream of data representing the results of the processing. Although the processor 68 is illustrated as receiving a serial stream of digital input data and generating a serial stream of digital output data, in certain implementations the processor 68 can be modified so as to process data in a parallel format. Additionally, in certain implementations, the processor 68 can process serial data to generate parallel data, or process parallel data to generate serial data.

Figure 4B:
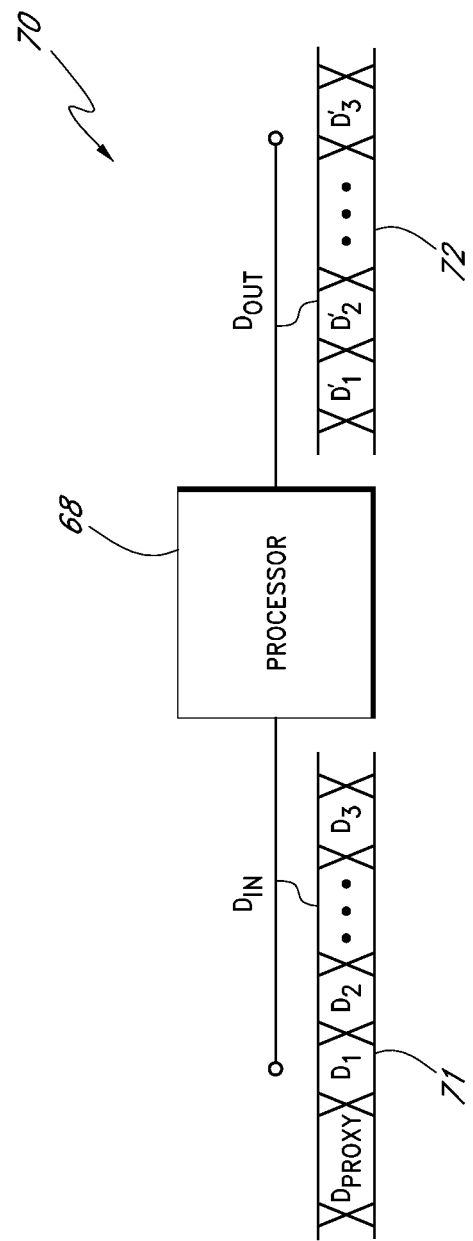
FIG. 4B is one example of a timing diagram for the IC of FIG. 4A.

FIG. 4B is one example of a timing diagram 70 for the IC 60 of FIG. 4A. The timing diagram 70 includes a first plot 71 illustrating timing for the digital input signal $D_{IN}$ and a second plot 72 illustrating timing for the digital output signal $D_{OUT}$. As shown in the first plot 71, the processor 68 can receive digital proxy data $D_{PROXY}$ corresponding to a digital representation of the proxy output voltage $V_{PROXY}$ and digital input data $D_1$, $D_2$, and $D_3$ corresponding to a digital representation of the first, second and third output voltages $V_{OUT\_1}$-$V_{OUT\_3}$, respectively. Although the first plot 71 is shown as including only digital data for three channels, additional data can be sent in implementations including more than three signal channels. Although the digital proxy data $D_{PROXY}$ is illustrated as being sent before the digital input data $D_1$-$D_3$, other implementations are possible.

The processor 68 can be configured to subtract the digital proxy data $D_{PROXY}$ from the digital input data $D_1$, $D_2$, and $D_3$ to generate digital output data $D'_1$, $D'_2$ and $D'_3$, respectively. The digital output data $D'_1$-$D'_3$ can have a reduced common-mode error level relative to the digital input data $D_1$, $D_2$, and $D_3$. The second plot 72 illustrates one possible sequence that the processor 68 can output the digital output data $D'_1$-$D'_3$. However, other implementations are possible.

FIG. 5A is a schematic block diagram of an IC 80 according to another embodiment. The IC 80 includes the first, second and third signal channels 2a-2c, the first and second proxy channels 4a, 4b, the bias voltage circuit 47, the voltage reference circuit 48, the multiplexer 62, the amplifier 64, the A-to-D converter 66, and the processor 68. Although two proxy channels 4a, 4b and three signal channels 2a-2c are illustrated in FIG. 5A, more or fewer proxy channels and/or signal channels can be included.

The IC 80 of FIG. 5A is similar to the IC 60 of FIG. 4A, but includes the first and second proxy channels 4a, 4b for generating first and second proxy output voltages $V_{PROXY\_1}$ and $V_{PROXY\_2}$, respectively. The multiplexer 62, the amplifier 64, and the A-to-D converter 66 can be used to provide digital representations of the first and second proxy output voltages $V_{PROXY\_1}$ and $V_{PROXY\_2}$ to the processor 68, which can process the proxy output voltages to generate a random noise-reduced proxy output voltage. For example, the processor 68 can be configured to average the digital representations of the proxy output voltages $V_{PROXY\_1}$ and $V_{PROXY\_2}$ to determine a random noise-reduced proxy output voltage level that can be subtracted from the digital representations of the output voltages $V_{OUT\_1}$-$V_{OUT\_3}$ of the signal channels 2a-2c, respectively. As was described earlier with respect to FIG. 1B, including a plurality of proxy channels can reduce a root mean square (RMS) random noise of the output signals relative to a scheme using a single proxy channel.

Figure 5B:
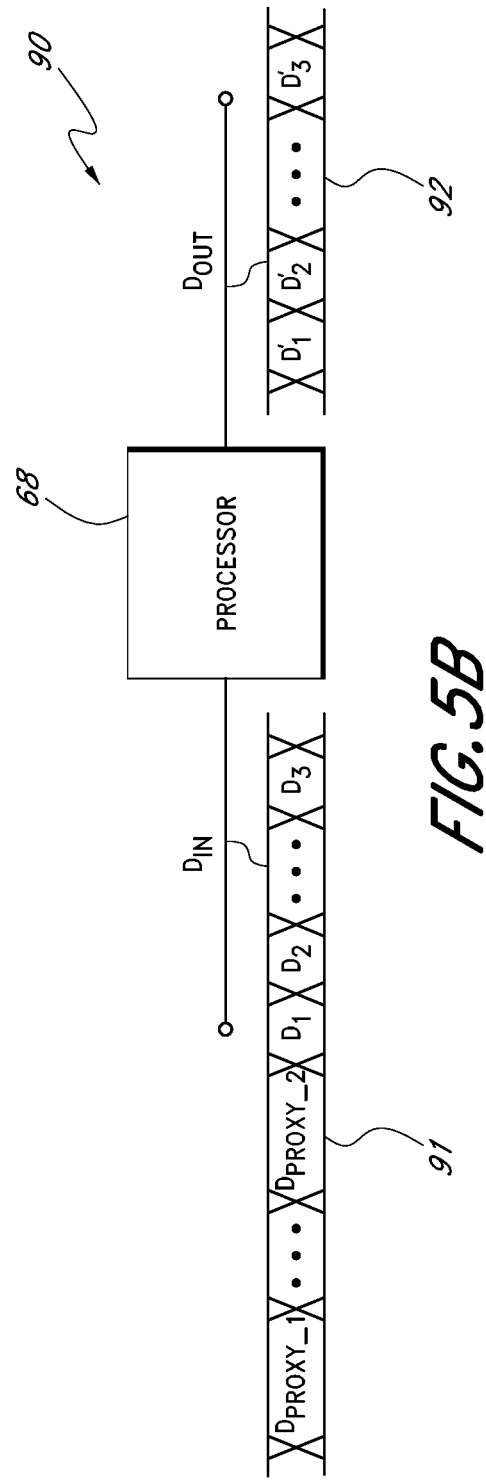
FIG. 5B is one example of a timing diagram for the IC of FIG. 5A.

FIG. 5B is one example of a timing diagram 90 for the IC 80 of FIG. 5A. The timing diagram 90 includes a first plot 91 illustrating timing for the digital input signal $D_{IN}$ and a second plot 92 illustrating timing for the digital output signal $D_{OUT}$. As shown in the first plot 91, the processor 68 can receive first digital proxy data $D_{PROXY\_1}$ corresponding to a digital representation of the proxy output voltage $V_{PROXY\_1}$, second digital proxy data $D_{PROXY\_2}$ corresponding to a digital representation of the proxy output voltage $V_{PROXY\_2}$, and digital input data $D_1$, $D_2$, and $D_3$ corresponding to a digital representation of the first, second and third output voltages $V_{OUT\_1}$-$V_{OUT\_3}$, respectively. Although the first plot 91 is shown as including only digital data for three signal channels and two proxy channels, additional data can be sent in implementations including a different number of signal and/or proxy channels. Although the first and second digital proxy data $D_{PROXY\_1}$, $D_{PROXY\_2}$ is illustrated as being sent before the digital input data $D_1$-$D_3$, other implementations are possible.

The processor 68 can be configured to process the first and second digital proxy data $D_{PROXY\_1}$, $D_{PROXY\_2}$ to generate a proxy data signal with reduced random noise. For instance, the processor 68 can average the first and second digital proxy data $D_{PROXY\_1}$, $D_{PROXY\_2}$. The processor 68 can then subtract the random noise-reduced proxy data from the digital input data $D_1$, $D_2$, and $D_3$ to generate digital output data $D'_1$, $D'_2$ and $D'_3$, respectively. The digital output data $D'_1$-$D'_3$ can have a reduced common-mode error level relative to the digital input data $D_1$-$D_3$. The second plot 92 illustrates one possible sequence that the processor 68 can output the digital output data $D'_1$-$D'_3$. However, other implementations are possible.

Figure 6:
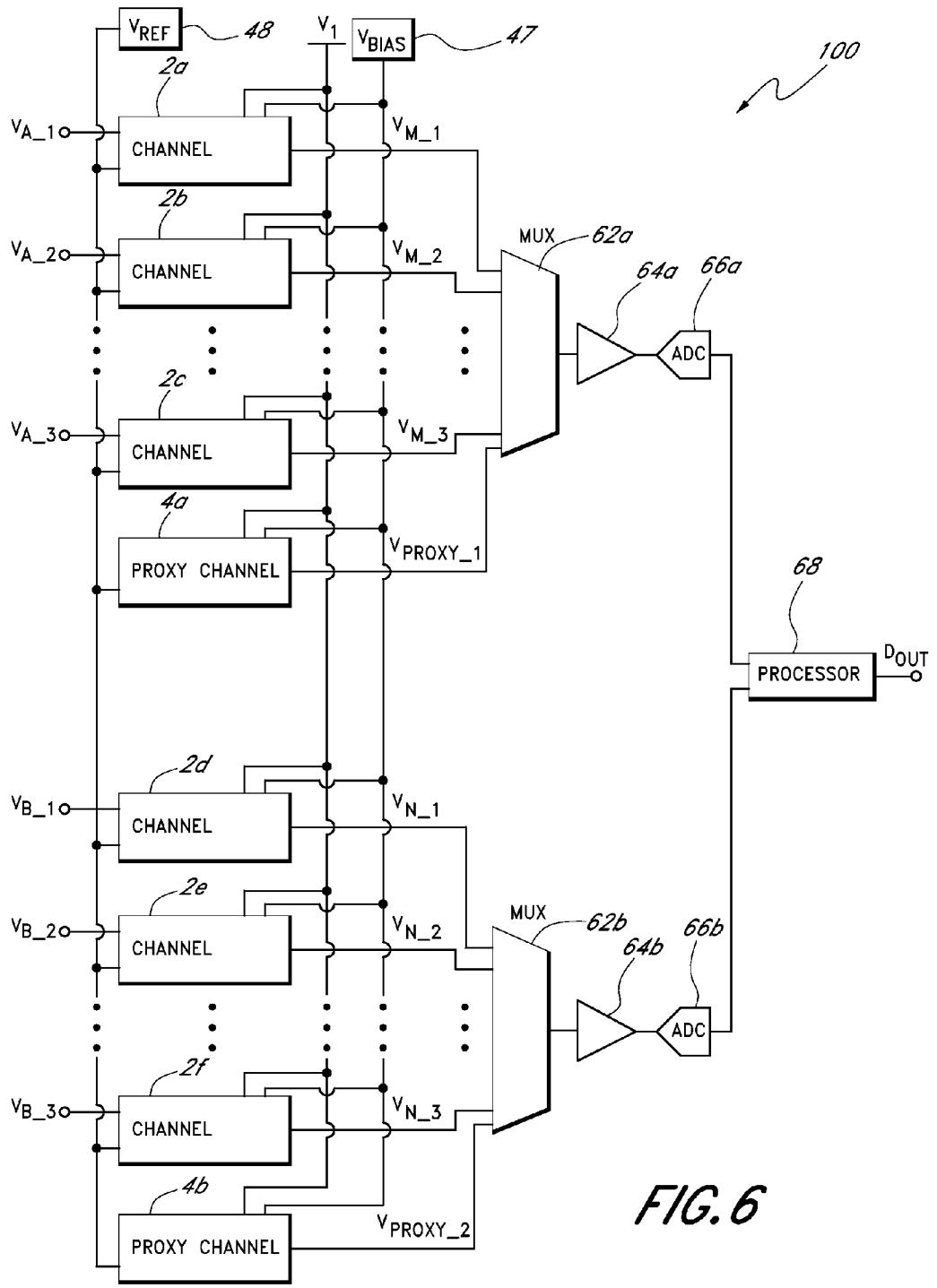
FIG. 6 is a schematic block diagram of an IC according to another embodiment.

FIG. 6 is a schematic block diagram of an IC 100 according to another embodiment. The IC 100 includes a plurality of signal channels 2a-2f, first and second proxy channels 4a, 4b, the bias voltage circuit 47, and the voltage reference circuit 48, first and second multiplexers 62a, 62b, first and second amplifiers 64a, 64b, first and second A-to-D converters 66a, 66b, and the processor 68.

The first, second, and third signal channels 2a-2c are configured to receive the input voltages $V_{A\_1}$, $V_{A\_2}$, and $V_{A\_3}$, respectively. The first, second and third signal channels 2a-2c can process the input voltages $V_{A\_1}$, $V_{A\_2}$, and $V_{A\_3}$ to generate output voltages $V_{M\_1}$, $V_{M\_2}$, and $V_{M\_3}$, respectively. Additionally, the fourth, fifth, and sixth signal channels 2d-2f are configured to receive the input voltages $V_{B\_1}$, $V_{B\_2}$, and $V_{B\_3}$, respectively. The fourth, fifth, and sixth signal channels 2d-2f can process the input voltages $V_{B\_1}$, $V_{B\_2}$, and $V_{B\_3}$ to generate output voltages $V_{N\_1}$, $V_{N\_2}$, and $V_{N\_3}$, respectively. The signal channels 2a-2f and the first and second proxy channels 4a, 4b are electrically connected to the power supply voltage $V_1$, are configured to receive a bias voltage from the bias voltage circuit 47, and are configured to receive a reference voltage from the voltage reference circuit 48. The first and second proxy channels 4a, 4b can generate a first proxy output voltage $V_{PROXY\_1}$ and a second proxy output voltage $V_{PROXY\_2}$, respectively, each of which can have a signal level corresponding to a common-mode error level of the signal channels 2a-2f.

The first multiplexer 62a includes a plurality of inputs configured to receive the first proxy output voltage $V_{PROXY\_1}$ and the output voltages $V_{M\_1}$-$V_{M\_3}$. Similarly, the second multiplexer 62b includes a plurality of inputs configured to receive the second proxy output voltage $V_{PROXY\_2}$ and the output voltages $V_{N\_1}$-$V_{N\_3}$. The outputs of the first and second multiplexers 62a, 62b are electrically connected to the inputs of the first and second amplifiers 64a, 64b, respectively. The outputs of the first and second amplifiers 64a, 64b are electrically connected to the inputs of the first and second A-to-D converters 66a, 66b, respectively. The processor 68 is electrically connected to the outputs of each of the A-to-D converters 66a, 66b, and can process the signals received from the A-to-D converters 66a, 66b to generate digital output data $D_{OUT}$.

The processor 68 can be used to compensate for common-mode error of the signal channels 2a-2f. For example, processor 68 can use the first and second multiplexers 62a, 62b and the first and second A-to-D converters 66a, 66b to obtain a digital representation of the output voltages $V_{M\_1}$-$V_{M\_3}$ and $V_{N\_1}$-$V_{N\_3}$ and the first and second proxy output voltages $V_{PROXY\_1}$, $V_{PROXY\_2}$, and can use data corresponding to the proxy voltages to generate common-mode noise-reduced output signals. In certain implementations, the processor 68 is configured to average the values of digital data corresponding to the first and second proxy output voltages $V_{PROXY\_1}$, $V_{PROXY\_2}$, and to subtract the averaged value of the proxy output voltages to generate the modified output signals. However, in other implementations, the processor 68 is configured to generate common-mode noise-reduced output signals corresponding to the signal channels 2a-2c by subtracting digital data corresponding to the first proxy output voltage $V_{PROXY\_1}$ from digital data corresponding to the output voltages $V_{M\_1}$-$V_{M\_3}$, and to generate common-mode noise-reduced output signals corresponding to the signal channels 2d-2f by subtracting digital data corresponding to the second proxy output voltage $V_{PROXY\_2}$ from digital data corresponding to the output voltages $V_{N\_1}$-$V_{N\_3}$.

As illustrated in FIG. 6, a group of signal channels and a proxy channel can be provided, and the outputs of the signal channels and the proxy channel can be electrically connected to a multiplexer 62a/62b. The output of the multiplexer 62a/62b can be provided to an A-to-D converter 66a/66b, and the output of the A-to-D converter 66a/66b can be electrically connected to a processor 68. By arranging signal channels in this manner, the number of A-to-D converters 66a/66b and/or processors 68 in the IC 100 can be reduced. In one implementation, an A-to-D converter and a proxy channel is provided for every eight signal channels. For example, in an implementation with 256 signal channels, the IC 100 can include 8 proxy channels and 8 A-to-D converters. However, a different number of proxy channels and/or A-to-D converters can be used in other configurations.

Additional details of the IC 100 can be similar to those described earlier with respect to FIGS. 1A-5B.

Figure 7:
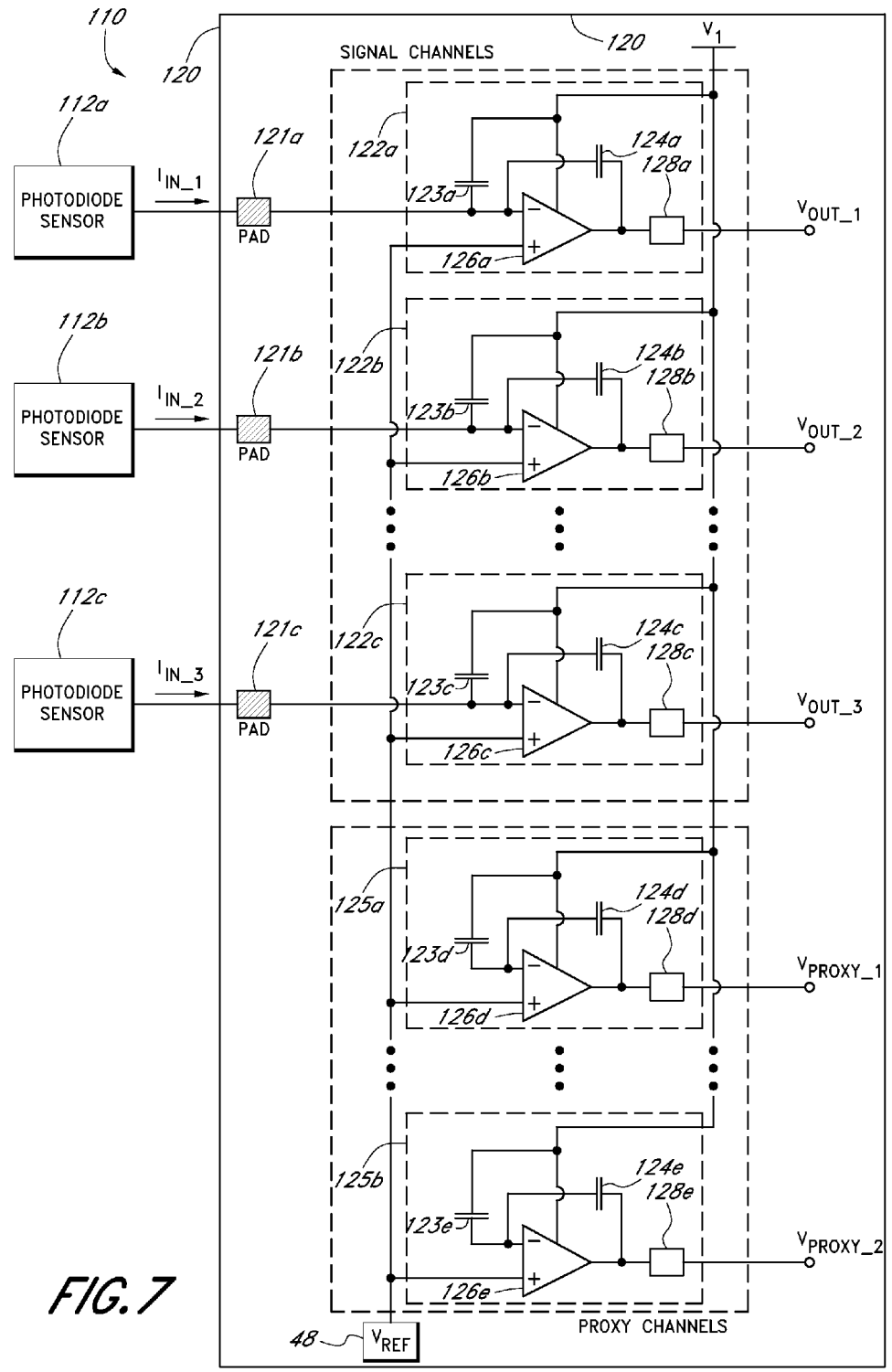
FIG. 7 is a schematic block diagram of an imaging system according to one embodiment.

FIG. 7 is a schematic block diagram of an imaging system 110 according to one embodiment. The illustrated imaging system 110 includes an IC 120 and a plurality of photodiode sensors 112a-112c.

The IC 120 includes a first pad 121a, a second pad 121b, a third pad 121c, a first signal channel 122a, a second signal channel 122b, a third signal channel 122c, a first proxy channel 125a, a second proxy channel 125b and a voltage reference circuit 48. The first, second and third signal channels 122a-122c are electrically coupled to the first, second and third photodiode sensors 112a-112c through the first, second and third pads 121a-121c, respectively. The photodiode sensors may generate signal currents $I_{IN\_1}$-$I_{IN\_3}$, which can flow into the first, second, and third pads 121a-121c respectively.

The first signal channel 122a includes a first amplifier 126a, a first parasitic supply capacitor 123a, a first feedback capacitor 124a, and a first sampling circuit 128a. The second signal channel 122b includes a second amplifier 126b, a second parasitic supply capacitor 123b, a second feedback capacitor 124b, and a second sampling circuit 128b. The third signal channel 122c includes a third amplifier 126c, a third parasitic supply capacitor 123c, a third feedback capacitor 124c, and a third sampling circuit 128c. The first amplifier 126a includes an inverting input electrically connected to the first pad 121a, to a first end of the first parasitic supply capacitor 123a, and to a first end of the first feedback capacitor 124a. The first amplifier 126a further includes a non-inverting input electrically connected to the voltage reference circuit 48 and an output electrically connected to a second end of the first feedback capacitor 124a and to an input of the first sampling circuit 128a. The second amplifier 126b includes an inverting input electrically connected to the second pad 121b, to a first end of the second parasitic supply capacitor 123b, and to a first end of the second feedback capacitor 124b. The second amplifier 126b further includes a non-inverting input electrically connected to the voltage reference circuit 48 and an output electrically connected to a second end of the second feedback capacitor 124b and to an input of the second sampling circuit 128b. The third amplifier 126c includes an inverting input electrically connected to the third pad 121c, to a first end of the third parasitic supply capacitor 123c, and to a first end of the third feedback capacitor 124c. The third amplifier 126c further includes a non-inverting input electrically connected to the voltage reference circuit 48 and an output electrically connected to a second end of the third feedback capacitor 124c and to an input of the third sampling circuit 128c. The first, second and third parasitic supply capacitors 123a-123c each further include a second end electrically connected to the power supply voltage $V_1$.

In contrast to the signal channels 122a-122c, the illustrated first and second proxy channels 125a, 125b do not receive an input signal from a pad. However, the first and second proxy channels 125a, 125b have a substantially similar circuit topology as the signal channels 122a-122c. For example, the first proxy channel 125a includes a fourth amplifier 126d, a fourth parasitic supply capacitor 123d, a fourth feedback capacitor 124d, and a fourth sampling circuit 128d, and the second proxy channel 125b includes a fifth amplifier 126e, a fifth parasitic supply capacitor 123e, a fifth feedback capacitor 124e, and a fifth sampling circuit 128e. The fourth amplifier 126d includes an inverting input electrically connected to a first end of the fourth parasitic supply capacitor 123d and to a first end of the fourth feedback capacitor 124d. The fourth amplifier 126d further includes a non-inverting input electrically connected to the voltage reference circuit 48 and an output electrically connected to a second end of the fourth feedback capacitor 124d and to an input of the fourth sampling circuit 128d. The fifth amplifier 126e includes an inverting input electrically connected to a first end of the fifth parasitic supply capacitor 123e and to a first end of the fifth feedback capacitor 124e. The fifth amplifier 126e further includes a non-inverting input electrically connected to the voltage reference circuit 48 and an output electrically connected to a second end of the fifth feedback capacitor 124e and to an input of the fifth sampling circuit 128e.

The first and second proxy channels 125a, 125b can have a common-mode error that is similar to that of the signal channels 122a-122c. For example, the first and second proxy channels 125a, 125b can have a similar circuit topology and circuit layout, and can receive the same reference signals as the signal channels 122a-122c. Accordingly, the first and second proxy channels 125a, 125b can have a similar systematic offset, such as systematic offset associated with circuit layout or associated with charge injection of the sampling circuits 128a-128e. Additionally, the common-mode noise of the first and second proxy channels 125a, 125b can be similar to that of the signal channels 122a-122c. For example, power supply noise, such as noise of the supply voltage $V_1$ coupled into the signal channels by the parasitic supply capacitors 123a-123e, common-mode noise of the voltage reference circuit 48 and/or common-mode noise of a bias circuit used to bias the amplifiers 126a-126e can be substantially the same between the proxy channels 125a, 125b and the signal channels 122a-122c.

Although not illustrated in this figure, a subtraction block can be provided for generating common-mode noise-reduced output signals using the output voltages $V_{OUT\_1}$-$V_{OUT\_3}$ and the proxy output voltages $V_{PROXY\_1}$ and $V_{PROXY\_2}$. For example, the proxy output voltages $V_{PROXY\_1}$ and $V_{PROXY\_2}$ can be averaged, and the averaged proxy output voltage can be subtracted from each of the output voltages $V_{OUT\_1}$-$V_{OUT\_3}$ to generate a plurality of common-mode noise-reduced output voltages. The subtraction block can be implemented as an analog block, such as the subtraction block 42 if FIG. 3, or as a digital block, such as the processor 68 of FIGS. 4A-6. Additionally, although two proxy channels 125a, 125b and three signal channels 122a-122c are illustrated in FIG. 7, more or fewer proxy channels and/or signal channels can be included.

The illustrated signal channels 122a-122c are integration circuits configured to generate output voltages $V_{OUT\_1}$-$V_{OUT\_3}$ proportional to about the integral over time of the signal currents $I_{IN\_1}$-$I_{IN\_3}$ from the photodiode sensors 112a-112c, respectively. Although not illustrated in FIG. 7, switch circuitry can be included to control the potential of the non-inverting inputs of the amplifiers 126a-126e to aid in controlling the interval of time over which the integration is performed. The amplifiers 126a-126e can be any suitable amplifiers, including, for example, complimentary metal oxide semiconductor (CMOS) amplifiers having a relatively high gain. The sampling circuits 128a-128e can be used to sample the outputs of the amplifiers 126a-126e. In one embodiment, the sampling circuits 128a-128e are correlated double sampling circuits configured to take two samples per cycle to aid in reducing offset error of the amplifiers 128a-128e. Although one example of a signal channel is illustrated in FIG. 7, the common-mode error reduction schemes described herein can be used in combination with other types of signal channels.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Applications

Devices employing the above described schemes can be implemented into various electronic devices. Examples of the electronic devices can include, but are not limited to, consumer electronic products, parts of the consumer electronic products, electronic test equipment, medical electronic products, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. The medical electronic products can include, but are not limited to, a Digital-X-ray detector, a CT (Computed Tomography) scanner, an Ultrasounds system, a MRI (Magnetic Resonance Imaging) system, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An imaging system, comprising:
   a plurality of image processing circuit channels having a substantially similar circuit topology to one another, wherein the plurality of image processing circuit channels are configured to receive a plurality of image sensor signals and to process the plurality of image sensor signals to generate a plurality of analog output signals;
   a plurality of proxy circuit channels having a substantially similar circuit topology to one another and to the plurality of image processing circuit channels, wherein the plurality of proxy circuit channels are configured to generate a plurality of analog proxy output signals associated with a common-mode noise of the plurality of image processing circuit channels, wherein the plurality of image processing circuit channels and the plurality of proxy circuit channels each comprise a differential amplifier, and wherein the plurality of analog output signals and the plurality of analog proxy output signals are generated in part by the differential amplifiers;
   a random noise reduction block configured to generate a common-mode noise reduction signal based on the plurality of analog proxy output signals; and
   a subtraction block configured to generate one or more output signals based on a difference between the common-mode noise reduction signal and one or more of the plurality of analog output signals.

2. The imaging system of claim 1, wherein the random noise reduction block is configured to generate the common-mode noise reduction signal based on an average of the plurality of analog proxy output signals.

3. The imaging system of claim 1, further comprising a processor comprising the random noise reduction block and the subtraction block, wherein the processor is configured to digitally generate the common-mode noise reduction signal, and wherein the processor is further configured to subtract the common-mode noise reduction signal from digital representations of each of the plurality of analog output signals.

4. The imaging system of claim 1, wherein the plurality of image sensor signals comprise a plurality of photodiode currents.

5. The imaging system of claim 1, wherein the plurality of proxy circuit channels do not receive any input signals.

6. The imaging system of claim 1, wherein the plurality of proxy circuit channels comprise a plurality of inputs biased to a DC voltage level.

7. An imaging system, comprising:
a plurality of image processing circuit channels having a substantially similar circuit topology to one another, wherein the plurality of image processing circuit channels are configured to receive a plurality of image sensor signals and to process the plurality of image sensor signals to generate a plurality of analog output signals;
a plurality of proxy circuit channels having a substantially similar circuit topology to one another and to the plurality of image processing circuit channels, wherein the plurality of proxy circuit channels are configured to generate a plurality of analog proxy output signals associated with a common-mode noise of the plurality of image processing circuit channels, wherein the plurality of image processing circuit channels and the plurality of proxy circuit channels each comprise an integration circuit and wherein the plurality of analog output signals and the plurality of analog proxy output signals are generated in part by the integration circuits;
a random noise reduction block configured to generate a common-mode noise reduction signal based on the plurality of analog proxy output signals; and
a subtraction block configured to generate one or more output signals based on a difference between the common-mode noise reduction signal and one or more of the plurality of analog output signals.

8. The imaging system of claim 1, wherein each differential amplifier of the plurality of image processing circuit channels comprises an inverting input that receives a respective one of the plurality of image sensor signals.

9. The imaging system of claim 1, wherein each differential amplifier of the plurality of image processing circuit channels and of the plurality of proxy circuit channels further comprises a non-inverting input that receives a reference voltage.

10. The imaging system of claim 1, wherein each differential amplifier of the plurality of image processing circuit channels and of the plurality of proxy circuit channels is electrically connected with negative feedback.

11. An imaging system, comprising:
a plurality of image processing circuit channels having a substantially similar circuit topology to one another, wherein the plurality of image processing circuit channels are configured to receive a plurality of image sensor signals and to process the plurality of image sensor signals to generate a plurality of analog output signals;
a plurality of proxy circuit channels having a substantially similar circuit topology to one another and to the plurality of image processing circuit channels, wherein the plurality of proxy circuit channels are configured to generate a plurality of analog proxy output signals associated with a common-mode noise of the plurality of image processing circuit channels;
a random noise reduction block configured to generate a common-mode noise reduction signal based on the plurality of analog proxy output signals;
a subtraction block configured to generate one or more output signals based on a difference between the common-mode noise reduction signal and one or more of the plurality of analog output signals;
a processor comprising the random noise reduction block and the subtraction block, wherein the processor is configured to digitally generate the common-mode noise reduction signal, and wherein the processor is further configured to subtract the common-mode noise reduction signal from digital representations of each of the plurality of analog output signals;
a multiplexor configured to generate a multiplexed signal by multiplexing between the plurality of analog output signals and the plurality of analog proxy signals; and
an analog-to-digital converter configured to generate a digital converted signal based on the multiplexed signal, wherein the processor is configured to receive the digital converted signal.

12. The imaging system of claim 11, wherein the processor is configured to receive digital representations of the plurality of analog output signals and of the plurality of analog proxy signals in a serial data stream.

13. The imaging system of claim 11, wherein the processor is further configured to average digital representations of the plurality of analog proxy signals to digitally generate the common-mode noise reduction signal.

14. The imaging system of claim 11, wherein the processor is further configured to generate one or more digital output signals based on subtracting the common-mode noise reduction signal from digital representations of the plurality of analog output signals.

15. The imaging system of claim 11, further comprising an amplifier configured to receive the multiplexed signal, and to amplify the multiplexed signal to generate an amplified signal, wherein the analog-to-digital converter comprises an input configured to receive the amplified signal.

16. An imaging system, comprising:
a plurality of image processing circuit channels having a substantially similar circuit topology to one another, wherein the plurality of image processing circuit channels are configured to receive a plurality of image sensor signals and to process the plurality of image sensor signals to generate a plurality of analog output signals;
a plurality of proxy circuit channels having a substantially similar circuit topology to one another and to the plurality of image processing circuit channels, wherein the plurality of proxy circuit channels are configured to generate a plurality of analog proxy output signals associated with a common-mode noise of the plurality of image processing circuit channels;
a random noise reduction block configured to generate a common-mode noise reduction signal based on the plurality of analog proxy output signals; and
a subtraction block configured to generate one or more output signals based on a difference between the common-mode noise reduction signal and one or more of the plurality of analog output signals,
wherein the plurality of proxy output signals are further associated with a systematic offset of the plurality of image processing circuit channels,
wherein the plurality of image processing circuit channels comprise a plurality of single-ended inputs.

17. The imaging system of claim 16, further comprising a reference voltage generation circuit configured to generate a reference voltage, wherein the plurality of image processing circuit channels and the plurality of proxy circuit channels receive the reference voltage.

18. A method of image processing, the method comprising:
processing a plurality of image sensor signals to generate a plurality of analog output signals using a plurality of image processing circuit channels, wherein the plurality of image processing circuit channels have a substantially similar circuit topology to one another;

generating a plurality of analog proxy output signals associated with a common-mode noise of the plurality of image processing circuit channels using a plurality of proxy circuit channels, wherein the plurality of proxy circuit channels have a substantially similar circuit topology to one another and to the plurality of image processing circuit channels;

multiplexing between the plurality of analog output signals and the plurality of analog proxy signals using a multiplexer;

amplifying an output of the multiplexer to generate an amplified signal using an amplifier;

converting the amplified signal to a digital output signal using an analog-to-digital converter;

providing the digital output signal to an input of a processor;

generating a common mode noise reduction signal based on the plurality of analog proxy output signals by averaging digital representations of the plurality of analog proxy output signals using the processor; and generating one or more output signals based on a difference between the common-mode noise reduction signal and one or more of the plurality of analog output signals.

19. The method of claim 18, wherein generating the one or more output signals comprises subtracting the common-mode noise reduction signal from digital representations of the plurality of analog output signals.

20. The method of claim 18, further comprising receiving digital representations of the plurality of analog output signals and the plurality of analog proxy signals in a serial data stream at the input of the processor.

21. The method of claim 18, further comprising:
generating a reference voltage using a reference voltage generation circuit; and
processing the plurality of image sensor signals based in part on the reference voltage; and
providing the reference voltage to the plurality of proxy circuit channels.

22. The method of claim 18, further comprising biasing a plurality of inputs of the plurality of proxy circuit channels to a DC voltage level.

* * * * *